Nov. 21, 1961 W. H. EBURN, JR 3,009,405
PHOTOGRAPHIC PRODUCT
Filed May 7, 1959 4 Sheets-Sheet 1
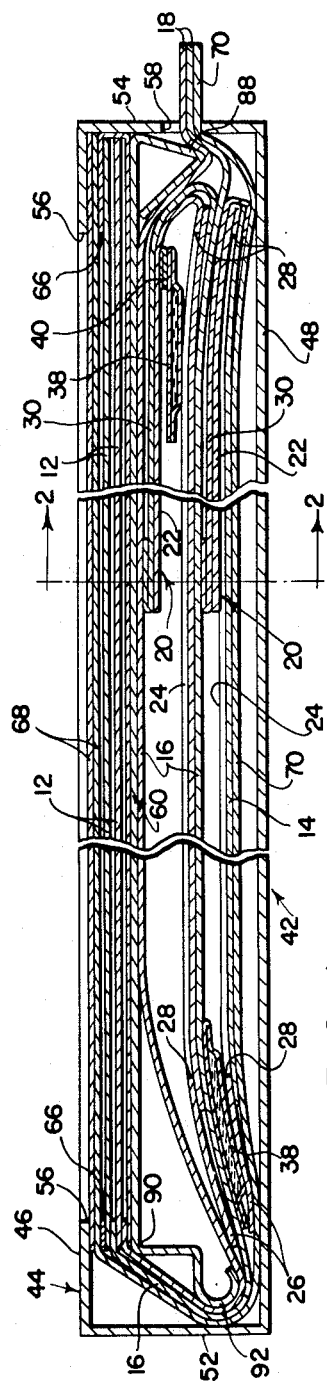
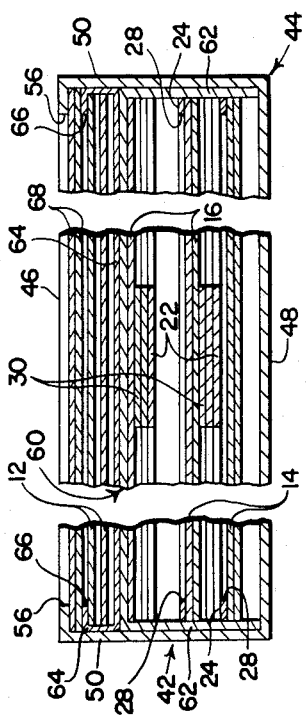
INVENTOR.
William H. Eburn, Jr.
BY Brown and Mikulka
and
Robert E. Corb
ATTORNEYS Nov. 21, 1961 W. H. EBURN, JR 3,009,405
PHOTOGRAPHIC PRODUCT Filed May 7, 1959 4 Sheets-Sheet 4

INVENTOR.
William H. Eburn, Jr.
BY
ATTORNEYS

United States Patent Office 3,009,405
Patented Nov. 21, 1961

3,009,405
PHOTOGRAPHIC PRODUCT
William H. Eburn, Jr., East Weymouth, Mass., assignor to Polaroid Corporation, Cambridge, Mass., a corporation of Delaware
Filed May 7, 1959, Ser. No. 811,684
11 Claims. (Cl. 95—13)

This invention relates to photographic products and particularly to improvements in photographic film assemblages of a type including sheet materials which are moved within the assemblage.

The present invention is concerned with photographic film assemblages which comprise a container and a pair of photographic elements within the container adapted to be withdrawn therefrom for processing. One of the elements is required to remain substantially stationary while the other element is moved with respect to and in contact with it. The film assemblage comprises at least one film unit including a photosensitive element adapted to be exposed within the assemblage, a second element positioned apart from the photosensitive element and adapted to be held stationary as the photosensitive element is moved into superposition with the second element, a connecting sheet for moving the photosensitive and second elements relative to one another and from the container in superposition with one another, and a processing fluid adapted to be distributed between the superposed photosensitive and second elements to effect the processing of the photosensitive element to produce, for example, a photographic transfer print.

Objects of the invention are: to provide in a photographic film assemblage including a container and a first element adapted to be held stationary within the container during movement of a second element within the container relative to and in contact with a first element and thereafter to be withdrawn from the container, novel and improved means for holding the first element stationary during movement of the second element relative to the first element into superposition therewith; to provide a film assemblage as described wherein said container includes an opening permitting withdrawal of said first and second elements from the container and means for positioning said first element adjacent and out of alignment with said opening so that a portion of said container in the region of said opening prevents the movement of said first element; and to provide a film assemblage of the type described wherein said first and second elements are joined by leader means projecting from the container through the opening for drawing the second element into superposition with the first element and withdrawing the superposed elements in superposition from the container through the opening.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a somewhat diagrammatic, sectional view of a film assemblage embodying the invention, the section being taken substantially midway between the sides of the assemblage;

FIG. 2 is a sectional view taken substantially along the line 22 of FIG. 1;

Figure 3:
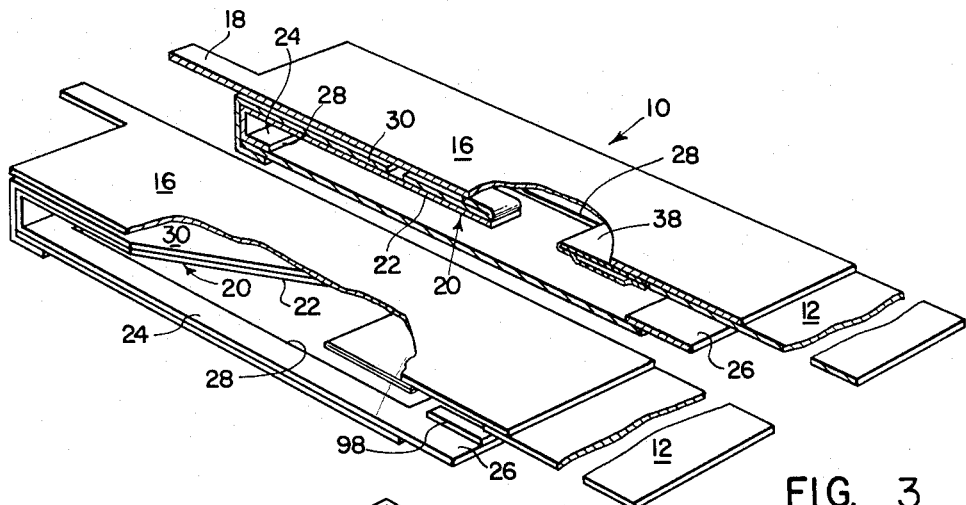
FIG. 3 is a somewhat schematic, fragmentary, perspective view of a component of the assemblage of FIG. 1.
Figure 4:
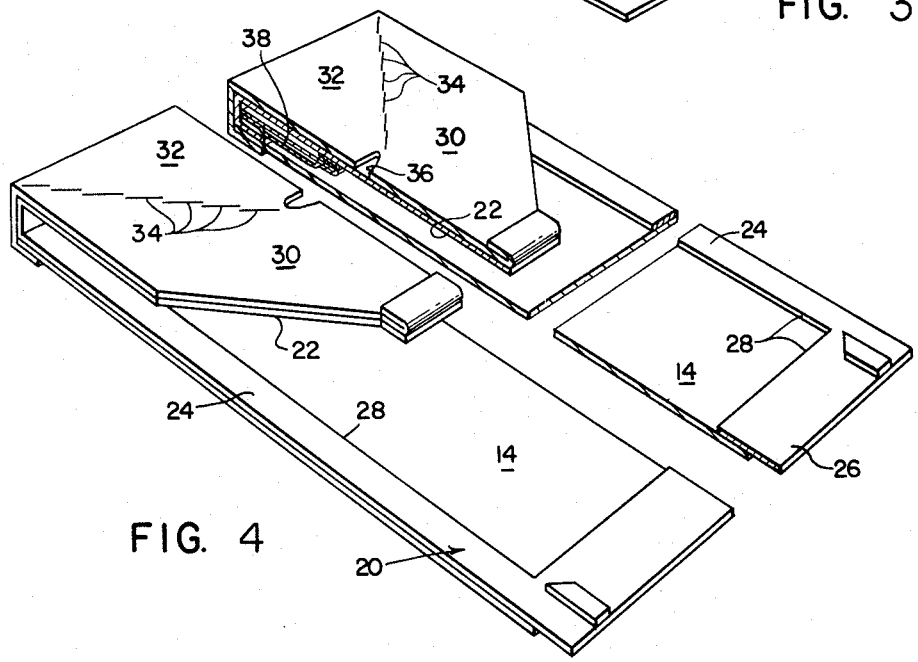
FIG. 4 is a fragmentary, perspective view of a portion of the component of FIG. 3.
Figure 5:
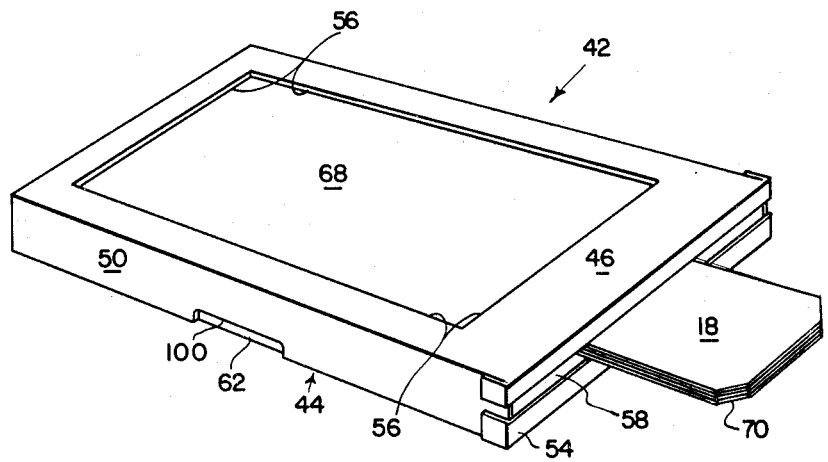
FIGS. 5 and 6 are front and rear perspective views, respectively, of the film assemblage of FIG. 1.
Figure 6:
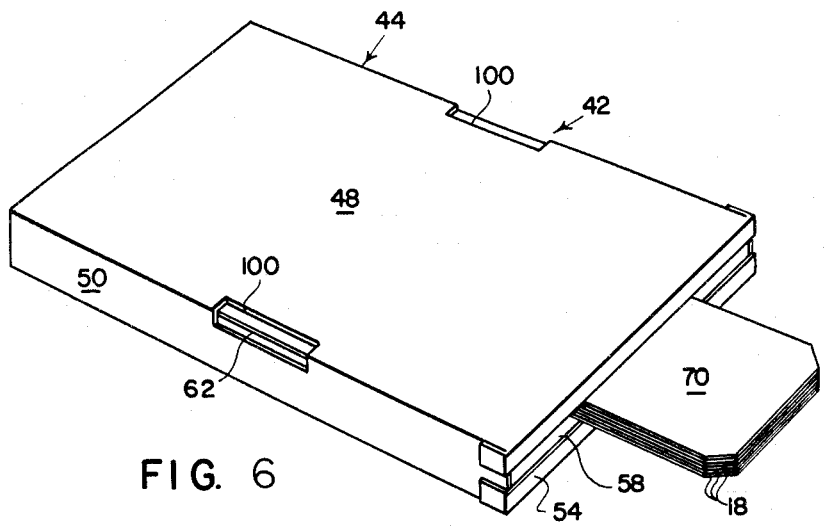

The present invention is shown as embodied in a photographic product in the form of a film assemblage or pack 42 illustrated in FIGS. 1, 2, 5 and 6 of the drawings. Film pack 43 preferably comprises a plurality of film units of the type shown in detail in FIGS. 3 and 4. Each of these film units, designated 10, comprises a photosensitive sheet 12 and a second or image-receiving sheet 14. The photosensitive sheet is generally rectangular and comprises a layer of photosensitive material carried on a suitable support. The photosensitive material may comprise any of the materials usually employed in photography including, for example, the silver halides or other photosensitive heavy metal salts capable of having a developable latent image formed therein by exposure to actinic light, the ferric salts and the diazonium compounds. The support for the photosensitive layer may comprise any of the flexible sheet materials generally used for film base, including paper, plastics, metallic foils and the like, and is preferably opaque to light actinic to the photosensitive material or includes a layer which is opaque to actinic light. Second sheet 14 is at least coextensive in area with the area or frame of the photosensitive sheet which is to be exposed and also comprises a flexible sheet material such as paper, plastic and the like. The second sheet in the form shown is substantially equal in width to, but slightly shorter than, the photosensitive sheet and is also opaque to light actinic to the photosensitive material. While the second sheet may merely aid in the spreading of a fluid processing composition in a thin layer on the photosensitive sheet, in a preferred form of the film uint the second sheet is adapted to provide a support for a positive transfer image produced, for example, by a silver halide diffusion transfer reversal process such as described in U.S. Patents Nos. 2,543,181, issued February 27, 1951, and 2,662,822, issued December 15, 1953, both in the name of Edwin H. Land. The second sheet accordingly may comprise an image-receiving layer such as described in the above-mentioned patents carried on a flexible support sheet.

Photosensitive sheet 12 is mounted on a first carrier sheet 16 formed of a flexible sheet material such as paper, plastic, and the like, and preferably of a material such as glassine paper which has a highly calendered, smooth surface. First carrier sheet 16 may be adapted to perform a multiplicity of functions including providing a leader for connecting the photosensitive and second sheets, positioning the photosensitive sheets relative to one another, moving the film unit within a camera or other apparatus, withdrawing the film unit from the camera or apparatus, mounting a container of a fluid processing composition and, in one embodiment, collecting any excess processing fluid. In the form shown in FIG. 3, carrier sheet 16 is substantially equal in width to photosensitive sheet 12 and is provided at one end, called its leading end, with a narrower leader portion 18. The opposite or trailing end of the carrier sheet is secured to the leading end of photosensitive sheet 12. This may be accomplished by adhering the photosensitive sheet directly to the carrier sheet by a suitable adhesive or by providing a narrow connecting member or strip. In an alternative embodiment of film unit 10, carrier sheet 16 may be of sufficient length so as to extend behind and beyond the trailing edge of the photosensitive sheet providing a trailing end portion for collecting excess processing fluid in a manner to be described hereinafter. In this last-mentioned embodiment, the photosensitive and image-receiving sheets may be substantially equal in length.

A second carrier sheet 20 is provided for mounting second or image-receiving sheet 14, and, like first carrier sheet 16, is adapted to perform a multiplicity of functions which include determining the area of the photosensitive and second sheets which are to be processed by a layer of the processing fluid spread between the sheets. Carrier sheet 20 comprises a tapered leading end section 22, an intermediate section 24 at least coextensive with second sheet 14 and a relatively short trailing end section 26. Second sheet 14 is mounted on intermediate section 24 with the image-receiving layer of sheet 14 disposed adjacent carrier sheet 20. Intermediate section 24 is provided with a generally rectangular aperture 28 defining the area of the image-receiving sheet in contact with which the fluid processing composition is spread and wherein a transfer image may be produced. The lateral margins of intermediate section 24 bordering the sides of aperture 28 cooperate in a manner to be described for confining the processing fluid between the sheets and for controlling the thickness of the layer of fluid spread between the sheets. Trailing end section 26 extends beyond the trailing edge of second sheet 14 and is adapted to co-operate with either the trailing end of the photosensitive sheet or, in the alternative embodiment, with the trailing end of first carrier sheet 16, for collecting excess processing fluid.

The end of tapered leading end section 22 is secured to first carrier sheet 16 intermediate the leading end of the first carrier sheet and the leading edge of photosensitive sheet 12 with the photosensitive layer of the photosensitive sheet and the image-receiving layer of the second sheet in face-to-face relation and with the leading edges of photosensitive and second sheets 12 and 14 substantially in alignment with one another. In the assembled form of the film unit shown, the trailing edge of second carrier sheet 20 should be disposed substantially in alignment with the trailing edge of photosensitive sheet 12. In the alternative embodiment wherein the photosensitive end second sheets are of substantially equal length and first carrier sheet 16 extends behind and beyond the trailing edge of the photosensitive sheet, the trailing edge of second carrier sheet 20 is in substantial alignment with the trailing edge of the first carrier sheet.

A tapered leader sheet 30, substantially coextensive with tapered leading end section 22 of carrier sheet 20, is provided secured at its trailing end to the leading edge of second sheet 14 at the surface thereof opposite carrier sheet 20, and at its leading edge to carrier sheet 16 at approximately the same location as is the leading edge of leading end section 22. Leader sheet 30 is provided with a tapered tear-out portion designated 32 and defined by a series of die cut lines 34 which extend from an aperture 36 in leader sheet 30 intermediate its ends and sides. Die cut lines 34 extend from aperture 36 outwardly toward the margins of leader sheet 30 where the latter is attached to second sheet 14. Tear-out section 32 provides means whereby, following processing of the photosensitive and image-receiving sheets, the image-receiving sheet may be separated from the photosensitive sheet and second carrier sheet 20. This is accomplished, for example, by inserting a fingernail into aperture 36 so as to grasp the narrowest portion of tear-out section 32 and tearing the latter along die cut lines 34 toward the leading edge of second sheet 14, and then employing the tear-out portion for peeling the second sheet away from carrier sheet 20 and photosensitive sheet 12. The bond between the tear-out portion of leader sheet 30 and the leading edge of the image-receiving sheet will, of course, be stronger than the bond between the image-receiving sheet and second carrier sheet 20 in order for stripping to occur.

The photosensitive and second sheets are adapted to be processed by a fluid composition carried in a rupturable container 38 mounted on either of carrier sheets 16 and 20 adjacent the leading edge of the photosensitive or second sheet which is secured to the particular carrier sheet. Container 38 is formed substantially as shown in the above-mentioned U.S. Patent No. 2,543,181 and comprises a rectangular blank of fluid- and vapor-impervious sheet material, folded longitudinally upon itself to provide two walls which are bonded together at their margins to form an elongated cavity for the processing fluid. The longitudinal seal is weaker than the shorter end seals and is adapted to become unsealed in response to hydraulic pressure generated within the fluid contents of the container by the application of compressive pressure to the container. Container 38, in the form shown in FIG. 1, is mounted on first carrier sheet 16 intermediate the leading edge of photosensitive sheet 12 and the point at which the second carrier sheet is secured to the first carrier sheet. The container extends substantially from side to side of the carrier sheet and the fluid cavity of the container is preferably at least as wide as aperture 28 in the intermediate section of the second carrier sheet. The longitudinal edge of the container, which is adapted to become unsealed, is located facing the photosensitive sheet and closest the leading edge thereof. In an alternative form of film unit, container 38 is mounted on leading end section 22 of second carrier sheet 20 adjacent the leading edge of second sheet 14. Container 38, as shown in FIG. 2, is secured to carrier sheet 20 with the longitudinal edge of the container, which is adapted to become unsealed, located nearest the second sheet by a hinge strip 40 secured at the opposite longitudinal edge of the container.

Film unit 10, when assembled in position for exposure, is disposed with carrier sheet 16 folded adjacent the leading edge of photosensitive sheet 12 so that the photosensitive sheet faces away from the image-receiving sheet in the same direction as the latter. In this position of the film unit, first carrier sheet 16 extends between the photosensitive and image-receiving sheets toward the leading end of the image-receiving sheet and the trailing end of the photosensitive sheet. Leading end section 22 of second carrier sheet 20 is folded inwardly between the photosensitive and print-receiving sheets toward the trailing end of the image-receiving sheet and the leading end of the photosensitive sheet so that leading end section 22, leader sheet 30 and container 38 are disposed between the photosensitive and second sheets which are located to the outside of the film unit. Leader portion 18 of first carrier sheet 16 projects from between the leading end of the image-receiving sheet and the trailing end of the photosensitive sheet to provide means for manipulating the film unit so as to position the photosensitive and image-receiving sheets in superposed, aligned relation.

A plurality of film units 10 are assembled in the form of a film pack 42 comprising means in the form of a generally parallelepiped shaped box or container 44 for enclosing the film units. Container 44 is adapted to fabrication from thin sheet material such as stiff paper, cardboard, sheet metal, plastic and the like, and comprises a rectangular forward wall 46 and a rear wall 48, joined by side walls 50, a trailing end wall 52 and a leading end wall 54. A rectangular exposure aperture 56 is provided in forward wall 46 for exposing the photosensitive sheets of film positioned within container 44 and leading end wall 54 is provided with a slot 58 intermediate the forward and rear walls for withdrawing film units from the container.

Mounted within container 44 is a substantially flat and rigid pressure plate 60 having dependent flanges 62. Pressure plate 60 is so dimensioned and disposed within the container as to extend substantially from end to end thereof with flanges 62 located closely adjacent the side walls of the container and extending rearwardly so as to abut against rear wall 48.

Each film unit 10 of the film pack is disposed within container 44 with the photosensitive sheet of the film unit located forward of pressure plate 60 between the latter and forward wall 46. The first carrier sheet 16 of each film unit is bent around the trailing end of the pressure plate, and the second sheet 14, first carrier sheet 16, second carrier sheet 20 and container 38 are disposed behind the pressure plate between the latter and rear wall 48. Each of the plurality of film units 10 provided in box 44 is arranged in the same manner, with the photosensitive sheets disposed in one stack forward of the pressure plate and the second sheets disposed in another stack to the rear of the pressure plate. The photosensitive sheets in this position extend across aperture 56 in position to be exposed through the aperture and the second sheets are loosely contained to the rear of the pressure plate between flanges 62.

Means are provided for preventing light from entering aperture 56 and/or 58 and exposing the photosensitive sheets. In the form shown in FIGS. 1 and 2, this means comprises an envelope 64 secured around the stack of photosensitive sheets 12 within box 44. Envelope 64 is provided with an aperture 66 in its forward wall which is substantially coextensive with aperture 56 in forward wall 46 whereby the photosensitive sheets positioned within the envelope may be exposed. A pair of cover sheets 68 are provided located in superposed relation across aperture 56 and aperture 66 between forward wall 46 of box 44 and the forward wall of envelope 64. Envelope 64 and cover sheets 68 are formed of a light-opaque material, for example black paper, plastic and the like, and two cover sheets are provided in superposition in order to preclude any chance of exposure of the foremost photosensitive sheet due to minute holes in the cover sheets. Leader 70 is connected to the leading ends of the cover sheets at a location near the trailing end of the film pack and extends around the trailing end of the pressure plate between the second sheets and rear wall 48 of box 44 and thence through slot 58 at the leading end of the box. While there is little or no possibility of light entering slot 58, exposing the photosensitive sheets, this is positively precluded by the arrangement of envelope 64 and cover sheets 68 whose primary function is to cooperate with forward wall 46 to provide a lighttight baffle sealing exposure aperture 56 against the admission of light.

The film pack of the invention is adapted to be employed in a camera or other lighttight apparatus having an opening through which leaders 18, and the film units which said leaders comprise, may be withdrawn from the apparatus. When a film pack has been positioned in the apparatus, cover sheets 68 are withdrawn from the pack by drawing on leader 70 which projects through slot 58 in leading end wall 54. The cover sheets are thus drawn around the trailing end of pressure plate 60 behind the latter and from container 44, thereby leaving aperture 56 uncovered and permitting exposure of the photosensitive sheets. Following exposure of the foremost photosensitive sheet 12 located adjacent forward wall 46, the leader portion 18 and first carrier sheet 16, comprising the same film unit as the exposed photosensitive sheet, are drawn through slot 58 from container 44. As first carrier sheet 16 moves through slot 58, the photosensitive sheet 12 connected thereto is drawn around the trailing end of the pressure plate behind the pressure plate into superposed registered relation with the second sheet 14 comprising the film unit. In the form of film pack shown in FIG. 1, as the photosensitive sheet is being moved into registration with the second sheet, container 38 mounted on first carrier sheet 16 is moved toward the leading end of the second sheet, and second carrier sheet 20 and leader sheet 30 are caused to roll progressively from the leading end thereof toward their trailing ends while the second sheet 14 remains substantially motionless within container 44.

Rolling of second carrier sheet 20 and leader sheet 30 should start along a transverse line at the leading ends of the sheets in the region of their attachment to first carrier sheet 16, necessitating that the second carrier sheet 20 and leader sheet 30 have a tendency to "break" or fold and roll more readily at this location. It is for this reason that the second carrier sheet and leader sheet are tapered so as to provide the least resistance to folding or breaking at their narrowest portions which occur at their point of attachment to the first carrier sheet.

While the foremost photosensitive sheet 12 is being drawn around the trailing end of the pressure plate into superposed and registered relation with the second sheet 14 comprising the same film unit, the second sheet and the remaining photosensitive sheets are required to be held substantially stationary with respect to the pressure plate and container 44. The present invention is concerned with improved means for holding the rearmost second sheet 14 substantially stationary with respect to container 44 while the photosensitive sheet 12, comprising the same film unit, is moved into superposition with the second sheet between the latter and rear wall 48 of the container, and for allowing the superposed sheets to be withdrawn in superposition from the container. This last-mentioned means is simple in its construction and reliable in its operation and comprises a portion of pressure plate 60 at the leading edge thereof folded rearwardly and thence toward the pressure plate to provide a rearwardly projecting ramp 88 at the leading end of the pressure plate for displacing the leading end of the rearmost second sheet 14 to the rear of slot 58 so that the leading end of the second sheet is out of alignment with slot 58 and is engaged by leading end wall 54 for preventing movement of the second sheet during movement of first carrier sheet 16 and the foremost photosensitive sheet 12. When second carrier sheet 20 and leader sheet 30 have been completely unrolled and withdrawn through aperture 58, continued withdrawal of the second carrier sheet and leader sheet is effective to bend the leading end of the carrier sheet sufficiently to move the latter, in superposition with the photosensitive sheet comprising the same film unit, through slot 58 from container 44.

Means are provided on pressure plate 60 at the trailing end thereof for cooperating with the photosensitive sheets to prevent movement of the photosensitive sheets during withdrawal of the foremost photosensitive sheet from the film pack. This last-mentioned means comprises providing a corner 90 having an abrupt edge located at the trailing end of pressure plate 60 in alignment with the leading edges of photosensitive sheets 12. The trailing end section 92 of pressure plate 60 is shaped so as to guide first carrier sheet 16 rearwardly and causing it to bend at the leading edge of the photosensitive sheet 12 to which it is attached. Trailing end section 92 of pressure plate 60 is curved at its rearmost portion to facilitate movement of the photosensitive sheets around the trailing end of the pressure plate. The configuration of trailing end section sheet 16 causes all the photosensitive sheets to be drawn against pressure plate 60 at corner 90, necessitating that the photosensitive sheets bend at this corner in order to move around the corner. The photosensitive sheets, because of their inherent stiffness, provide sufficient resistance to such bending to preclude any movement of the photosensitive sheet as the latter is being moved. Because the foremost or outermost photosensitive sheet is not compressed against the pressure plate at corner 90 by any other photosensitive sheet or carrier sheet 16 and is more remote from corner 90, it does not have to bend so sharply, with the result that it is free to bend more easily so as to move around the corner when drawn around the corner by first carrier sheet 16 attached to the foremost photosensitive sheet.

Figure 7:
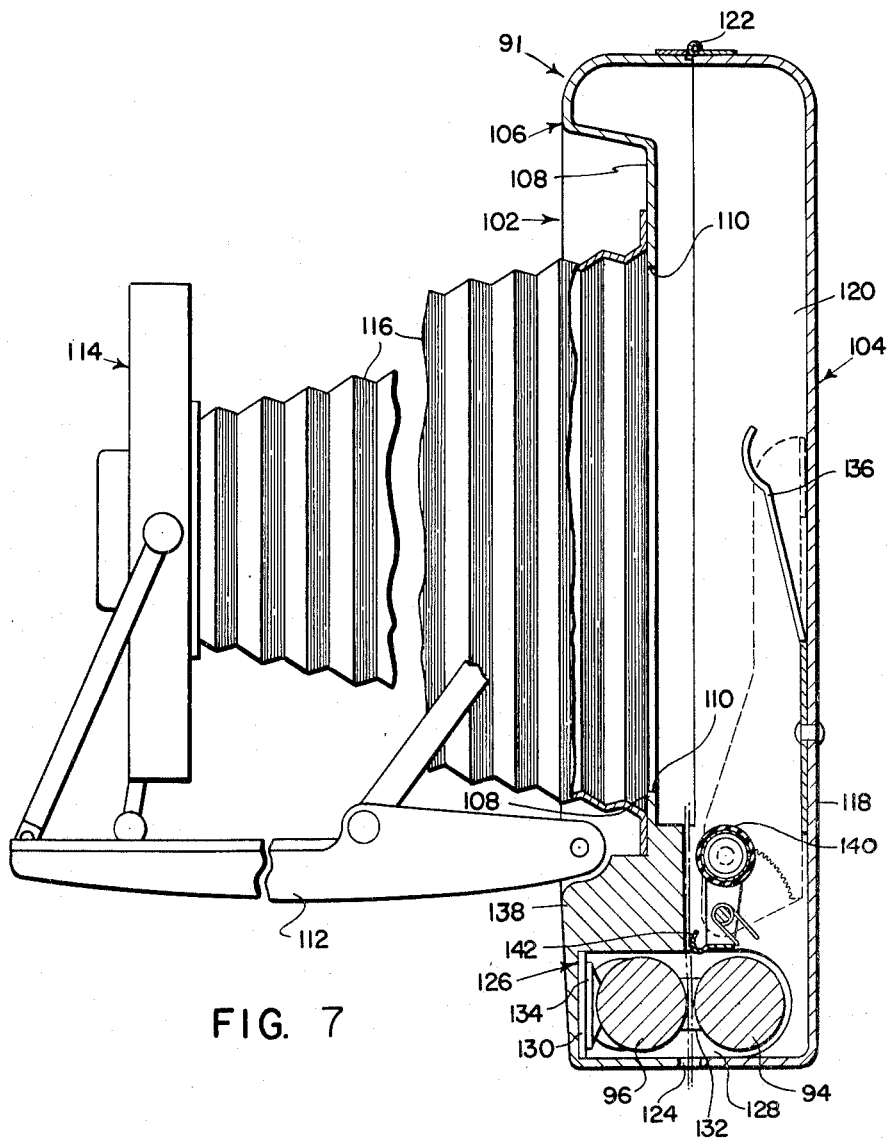
FIG. 7 is a somewhat schematic, sectional view of photographic apparatus in the form of a camera of the type in which the film assemblage of the invention is adapted to be employed.

The film pack is adapted to be employed in photographic apparatus such as the camera shown in FIG. 7 of the drawings, and which includes means for spreading the fluid contents of the container of each film unit between the photosensitive and second sheets of the film unit. This fluid-spreading means comprises a pair of juxtaposed members between which the photosensitive and second sheets are moved in superposition for spreading the fluid and may be biased toward one another or may be spaced a fixed distance apart so as to provide a fixed gap through which the sheets are moved. The fluid to be spread between the photosensitive and second sheets is quite viscous and is provided between the sheets so that as the sheets are moved between the pressure-applying members, the fluid is caused to be spread in a thin layer, the thickness of which is a function of the compressive pressure applied by the pressure-applying members and of intermediate section 24 of second carrier sheet 20 located between sheets 12 and 14 during fluid spreading. Intermediate section 24 functions as a mask for spacing apart the pressure-applying members and for defining the areas of the photosensitive and second sheets in which processing occurs by limiting the area of contact between the fluid and second sheet 14 to the region within aperture 28 in intermediate section 24.

As the sheets with the fluid container therebetween are moved between the pressure-applying members, the fluid contents of container 38 are ejected from the container and are advanced relative to and between the photosensitive and second sheets. In order to insure a complete spread of the fluid in a layer of the desired thickness over a predetermined area which is preferably coextensive with aperture 28, the fluid is usually provided in the container in an amount greater than the minimum required for the desired layer. This necessitates the provision of means for collecting any excess fluid which may be spread beyond the end of the desired area to prevent the same from being squeezed from the trailing end of the film unit. This last-mentioned means for collecting and retaining excess fluid comprises trailing end section 26 of second carrier sheet 20 and the corresponding trailing end section of photosensitive sheet 12. In the alternative embodiment previously described wherein first carrier sheet 16 extends behind and beyond the trailing end of the photosensitive sheet, the trailing end portion of the first carrier sheet cooperates with trailing end section 26 to provide the means for trapping and retaining excess processing fluid. Provision is made for spacing apart the trailing end sections of the sheets comprising the fluid-collecting means as these trailing end sections are moved between the pressure-applying rolls so as to provide a space between the trailing end sections in which excess fluid is collected. This last-mentioned means in the form shown comprises a pair of spacing elements 98 mounted on trailing end section 26 adjacent the margins thereof. Where the film unit is to be used with pressure-applying members of the type which are spaced a fixed minimum distance apart, which distance is greater than the combined thickness of the two trailing end sections comprising the fluid-collecting means, spacing members 98 may be unnecessary.

Pressure plate 60 is provided in the film pack for supporting photosensitive sheets 12 in position for exposure against forward wall 46 across aperture 56. Resilient means are provided in the camera for biasing the pressure plate toward forward wall 46 and, for this purpose, openings 100 are provided in the rear of the film pack at the intersection of each of side walls 50 and rear wall 48. Openings 100 permit resilient members in the camera to engage flanges 62 on pressure plate 60 for biasing the pressure plate toward the front of the film pack.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic product comprising, in combination, a container having an opening at one end, at least a film unit within said container adapted to be withdrawn from said container through said opening, said film unit including a first element, a second element positioned apart from said first element adjacent said opening and means connecting said first and second elements for moving said first element relative to said second element into superposition therewith and for withdrawing said elements in superposition from said container through said opening, the last-mentioned means being joined to said second element at the end thereof adjacent said opening, said opening being at least equal in width to said elements and having a depth sufficient to admit the passage of said film unit, means within said container for positioning said second element out of alignment with said opening whereby said second element is restrained by said container against movement during movement of said first element relative to said second element into superposition therewith, said means connecting said first and second elements extending past the last-named means through said opening.

2. A photographic film assemblage comprising, in combination, a container for enclosing photographic sheet materials; a film unit mounted within said container and adapted to be withdrawn therefrom following exposure; said container including a wall having a slot at least equal in width to said film unit and having a depth sufficient to admit the passage of said film unit, said film unit including a first sheet positioned within said container with one end adjacent said wall and said slot and a second sheet apart from said first sheet and means positioned in contact with said first sheet, extending through said slot, and connecting said first and second sheets for moving said second sheet relative to said first sheet into superposition therewith and withdrawing said film unit from said container through said slot; and means for positioning said end of said first sheet out of alignment with said slot whereby said first sheet is restrained by said wall against movement during movement of said second sheet relative to said first sheet into superposition therewith, said means connecting said first and second sheets extending past the last-named means through said slot.

3. A photographic film assemblage comprising, in combination, a container having an exposure aperture for transmitting light for exposing photosensitive material within said container, a film unit including a photosensitive element and a second element adapted to be superposed with said photosensitive element following exposure thereof, said film unit being mounted within said container with said photosensitive element positioned for exposure in alignment with said exposure aperture, said container including a withdrawal slot at least equal in width to said film unit and having a depth sufficient to admit the passage of said film unit, said second element being positioned within said container apart from said photosensitive element and with one end positioned adjacent said withdrawal slot, said film unit including a third element coupled with said photosensitive element, positioned in contact with said second element and extending through said slot, for drawing said photosensitive element into superposition with said second element and drawing the superposed elements from said container through said slot, and means for positioning said end of said second element out of alignment with said slot whereby said second element is restrained by said container against movement during movement of said photosensitive element into superposition with said second element.

4. The photographic film assemblage of claim 3 wherein said photosensitive, second and third elements are arranged in overlying relation and said means for positioning said end of said second element out of alignment with said opening comprises a dividing member located between said photosensitive element and said second and third elements.

5. A photographic film assemblage comprising, in combination, a container having an exposure aperture for transmitting light for exposing photosensitive material within said container; a plurality of film units each including a photosensitive element and a second element adapted to be superposed with said photosensitive element following exposure; said film units being mounted within said container with said photosensitive elements arranged in stacked relation in alignment with said exposure aperture, said container including a withdrawal slot at least equal in width to said film units and having a sufficient depth to admit the passage of each of said film units, said second elements of said film units being positioned within said container apart from said photosensitive elements and with one end of each of said second elements located adjacent said withdrawal slot, each of said film units including a third element coupled with said photosensitive element, positioned in contact with said second element comprising each said film unit and extending through said slot for drawing the last-mentioned photosensitive element into superposition with the last-mentioned second element and drawing the superposed elements from said container through said slot; and means for positioning said one ends of said second elements out of alignment with said slot whereby the second element of each film unit is restrained by said container against movement during movement of the photosensitive element of the last-mentioned film unit into superposition with the last-mentioned second element.

6. A photographic film assemblage comprising, in combination, a box-like container having forward and rear walls and an end wall joining said forward and rear walls, said forward wall including an aperture for transmitting light for exposing photosensitive material within said container; a film unit, including a photosensitive element and a second element adapted to be superposed with said photosensitive element following exposure thereof, mounted within said container with said photosensitive element positioned for exposure in alignment with said exposure aperture; said end wall of said container including a slot at least equal in width to said film unit and having a depth sufficient to admit the passage of the superposed photosensitive and second elements, said slot being located in said end wall intermediate said forward and rear walls, said second element of said film unit being positioned within said container apart from and in overlying relation with said photosensitive element with one end of said second element located adjacent said end wall and said withdrawal slot, said film unit including a third element coupled with said photosensitive element, located in contact with said second element and extending through said slot for drawing said photosensitive element into superposition with said second element and drawing the superposed elements from said container through said slot, said second element being positioned to the rear of said photosensitive element and said third element being located intermediate said photosensitive and second elements; and means for positioning said end of said second element toward said rear wall out of alignment with said slot whereby said second element is restrained by said end wall against movement during movement of said photosensitive element into superposition with said second element.

7. The photographic film assemblage of claim 6 wherein said means for positioning said end of said second element out of alignment with said slot comprises a dividing member located within said container between said photosensitive element and said second and third elements.

8. The photographic film assemblage of claim 6 wherein said third element is coupled with said second element at said one end of said second element.

9. A photographic film assemblage comprising, in combination, a box-like container having forward and rear walls and an end wall joining said forward and rear walls, said forward wall including an aperture for transmitting light for exposing photosensitive materials within said container; a plurality of film units, each including a photosensitive element and a second element adapted to be superposed with said photosensitive element following exposure thereof, mounted within said container with said photosensitive elements arranged in stacked relation in position for exposure in alignment with said exposure aperture; said end wall of said container including a slot at least equal in width to said film units and having a depth sufficient to admit the passage of a film unit, said slot being located in said end wall intermediate said forward and rear walls, said second elements of said film units being positioned within said container to the rear of said photosensitive elements in overlying relation therewith, said second elements being positioned with one end portion thereof located adjacent said end wall and said withdrawal slot, each of said film units including a third element coupled with the photosensitive and second elements of each said film unit, said third element of each film unit being located in contact with the second element thereof and extending through said slot for drawing the photosensitive element of each said film unit into superposition with the second element thereof and drawing each said film unit from said container through said slot, said third element of each film unit being located intermediate the photosensitive and second elements thereof and said second and third elements of said film units being arranged in stacked relation in alternating order; and means for positioning said ends of said second elements toward said rear wall out of alignment with said slot whereby each of said second elements is restrained by said end wall against movement during movement of the photosensitive element of the same film unit into superposition with the last-mentioned second element.

10. The photographic film assemblage of claim 9 wherein said means for positioning said second elements out of alignment with said slot comprises a dividing member located within said container between said photosensitive elements and said second and third elements.

11. The photographic film assemblage of claim 9 wherein each of said third elements is coupled with the second element of the same film unit at said one end of the last-mentioned second element.

References Cited in the file of this patent

UNITED STATES PATENTS

| | | |
|---|---|---|
| 1,198,465 | McArthur | Sept. 19, 1916 |
| 1,219,588 | Ruttan | Mar. 20, 1917 |

UNITED STATES PATENT OFFICE
CERTIFICATE OF CORRECTION

Patent No. 3,009,405                                 November 21, 1961

William H. Eburn, Jr.

It is hereby certified that error appears in the above numbered patent requiring correction and that the said Letters Patent should read as corrected below.

Column 1, line 71, for "22" read -- 2-2 --; column 2, line 39, for "uint" read -- unit --; column 4, line 67, after "film" insert -- units --; column 6, line 60, after "section" insert -- 92 and corner 90 is such that tension on outermost carrier --; line 66, for "movement of the photosensitive sheet" read -- movement of the photosensitive sheets due to friction with the foremost photosensitive sheet --.

Signed and sealed this 2nd day of April 1963.

(SEAL)
Attest:

ESTON G. JOHNSON                                        DAVID L. LADD
Attesting Officer                                            Commissioner of Patents